(12) United States Patent
Lu

(10) Patent No.: US 7,059,079 B2
(45) Date of Patent: Jun. 13, 2006

(54) LIGHT EMITTING BUOYAGE WITH A MAGNETIC SWITCH

(76) Inventor: Chen Dung Lu, 235 Chung-Ho Box 8-24, Taipei (TW)

( * ) Notice: Subject to any disclaimer, the term of this patent is extended or adjusted under 35 U.S.C. 154(b) by 0 days.

(21) Appl. No.: 10/919,496

(22) Filed: Aug. 17, 2004

(65) Prior Publication Data

US 2006/0037229 A1    Feb. 23, 2006

(51) Int. Cl.
*A01K 93/02*    (2006.01)
(52) U.S. Cl. ........................................... 43/17
(58) Field of Classification Search .................... 43/17, 43/17.5
See application file for complete search history.

(56) References Cited

U.S. PATENT DOCUMENTS 4,437,255 A * 3/1984 Reed .............................. 43/17
5,052,145 A * 10/1991 Wang ........................... 43/17.5
5,351,431 A * 10/1994 Ryu ................................ 43/17
5,898,372 A * 4/1999 Johnson et al. ........... 340/573.2
6,397,510 B1 * 6/2002 Klein .............................. 43/17

* cited by examiner

*Primary Examiner*—Kurt Rowan

(57) ABSTRACT

A light emitting buoyage with a magnetic switch comprises a buoyage magnetic switch body connected to the buoyage; a light emitting diode at an upper end of the magnetic switch body; a battery at a lower end of the light emitting diode; a magnetic element at a lower end of the battery; a connecting wire of the magnetic switch body extending from a lower end of the magnetic element; and a switch unit installed in the magnetic switch body at one side of the magnetic element. The battery and the magnetic element are transversally or longitudinally in the magnetic switch body. The magnetic element has a body. The body is installed with at least one retaining magnetic block and at least one movable magnetic block. The body is screwed to a lower end of the magnetic switch body; and the connecting wire is connected to the movable magnetic block.

11 Claims, 11 Drawing Sheets

LIGHT EMITTING BUOYAGE WITH A MAGNETIC SWITCH

FIELD OF THE INVENTION

The present invention relates to fishing, and particularly to a light emitting buoyage with a magnetic switch, wherein the buoyage can emit light so as to inform the user that a fish is biting the bait.

BACKGROUND OF THE INVENTION

Conventionally, a buoyage is arranged at one end of a fishing rod for alerting the fisher that a fish is hooked so that the fisher can lift the rod at a proper timing.

In the prior art, the buoyage is made of a plastic material or by plant stalks as a long floating body. The buoyage has various sizes. Most of the buoyages are moved when a fisher pulls a bait. Thereby the buoyage can float with the level of the water. However when water flows quickly, the buoyage will move upwards or downwards quickly so that the fisher will make a mistake to consider that a fish has bitten the bait. Thereby there is an eager demand for a buoyage which can correctly indicate the condition of fishing.

SUMMARY OF THE INVENTION

Accordingly, the primary object of the present invention is to provide a light emitting buoyage with a magnetic switch, wherein the buoyage can emit light so as to inform the user that a fish is biting the bait.

To achieve above objects, the present invention provides a light emitting buoyage with a magnetic switch which comprises: a buoyage; a magnetic switch body connected to the buoyage; a light emitting diode at an upper end of the magnetic switch body; a battery at a lower end of the light emitting diode; a magnetic element at a lower end of the battery; a connecting wire of the magnetic switch body extending from a lower end of the magnetic element; and a switch unit installed in the magnetic switch body at one side of the magnetic element. The battery and the magnetic element are transversally or longitudinally installed in the magnetic switch body. The magnetic element has a body; the body is installed with at least one retaining magnetic block and at least one movable magnetic block; the body is screwed to a lower end of the magnetic switch body; and the connecting wire is connected to the movable magnetic block.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
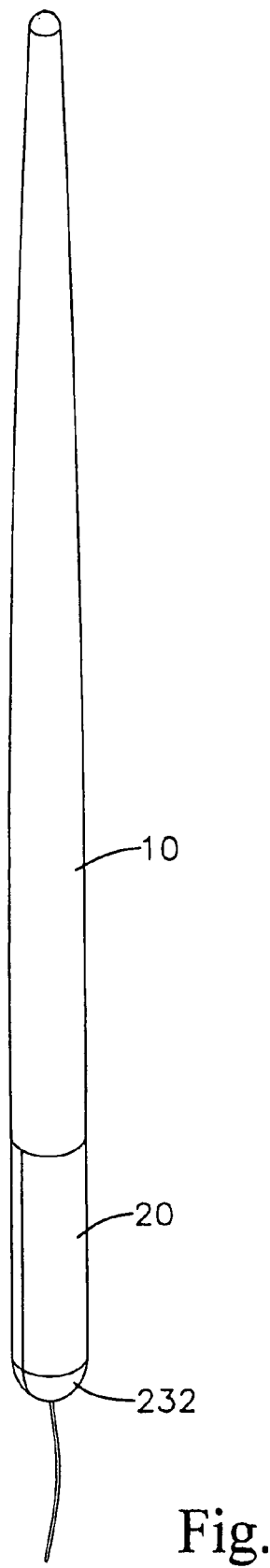
FIG. 1 is a perspective view of the present invention.
Figure 2:
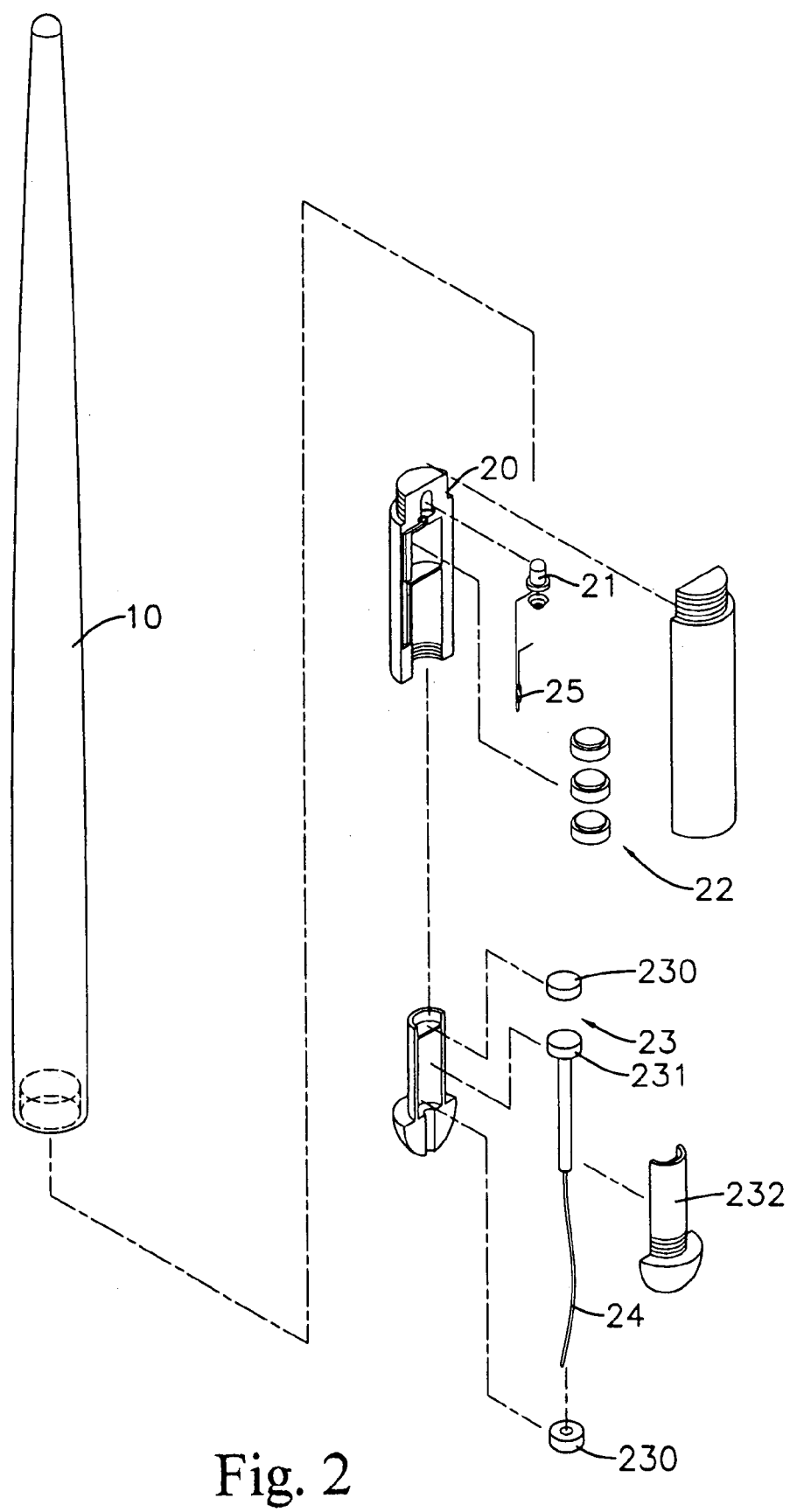
FIG. 2 is an exploded perspective view of the present invention.
Figure 3:
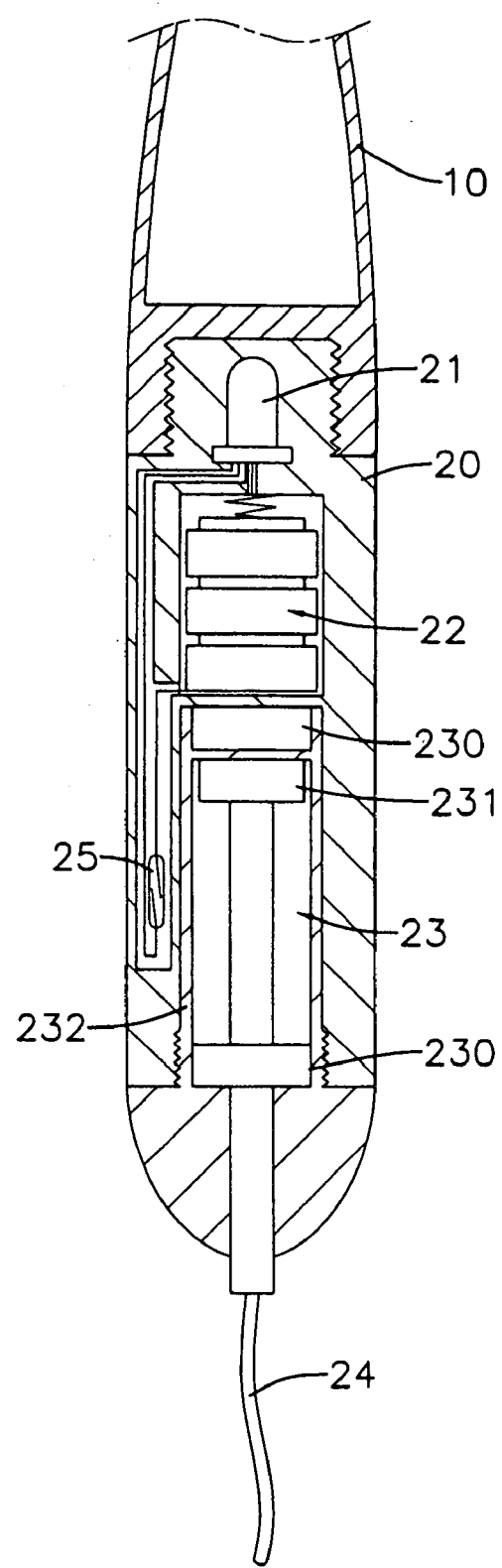
FIG. 3 is a partial cross sectional view of the present invention.

With reference to FIGS. 1 to 3, the present invention has the following elements.

A buoyage 10 is included.

A magnetic switch body 20 is connected to the buoyage 10. An upper end of the magnetic switch body 20 is installed with the light emitting diode 21. A lower end of the light emitting diode 21 is installed with a battery 22. A lower end of the battery 22 is installed with a magnetic element 23. A lower end of the magnetic element 23 is extended with a connecting wire 24 of the magnetic switch body 20. A portion of the magnetic element 23 at one side of the magnetic element 23 is installed with a switch unit 25 which is electrically connected to the light emitting diode 21 and the battery 22.

As for this embodiment, the battery 22 and the magnetic element 23 is installed within the magnetic switch body 20. The magnetic element 23 includes a body 232. The body 232 is transversally installed with a retaining magnetic block 230 and a movable magnetic block 231. The connecting wire 24 is connected to the movable magnetic block 231. In the present invention, the body 232 is screwed into the lower end of the magnetic switch body 20. Thereby the screwing extent of the body 232 with the magnetic switch body 20 is used to control the sensitivity of the magnetic element 23 so that it can be used in different placed.

Figure 4:
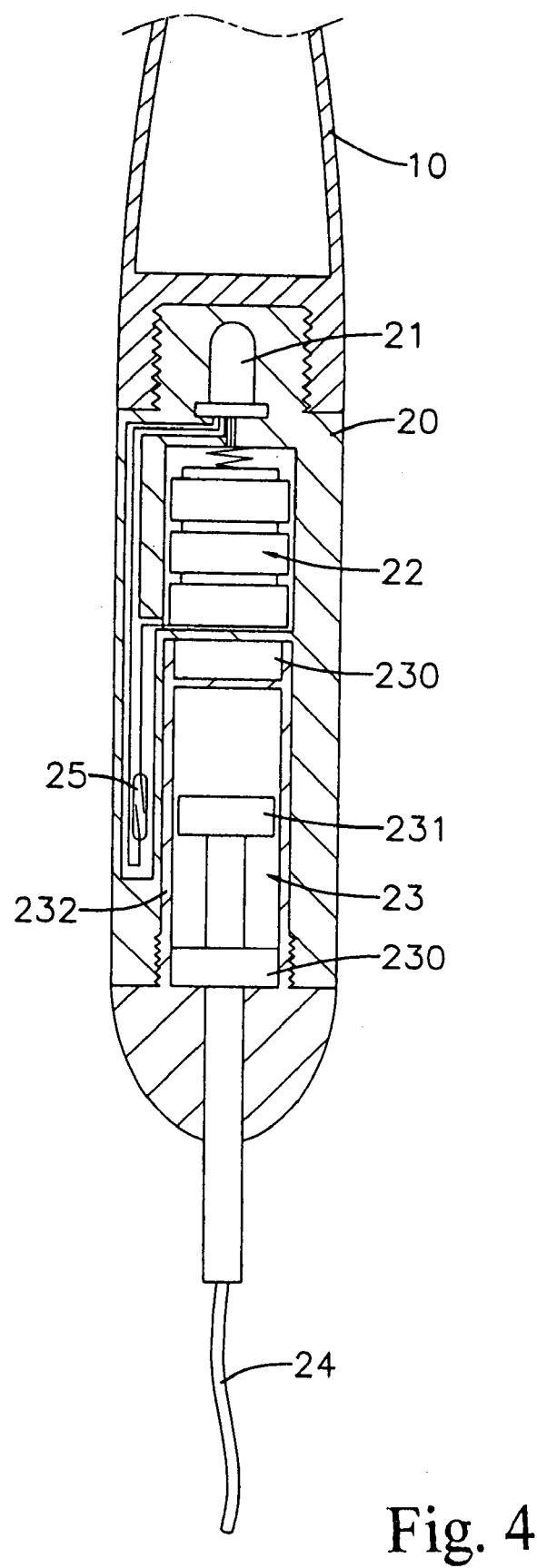
FIG. 4 is a cross sectional view of the embodiment illustrated in FIG. 3.

Referring to FIGS. 3 and 4, when a fish bites a fishing wire so as to drive the connecting wire 24 to pull the movable magnetic block 231, the movable magnetic block 231 will move to the position of the switch unit 25. Then, the magnetic force will cause the switch unit 25 to switch on so that the light emitting diode 21 and the battery 22 are conductive. When the bait is released by a fish, the connecting wire 24 has no pulling force applied thereon. The movable magnetic block 231 will return so that the switch unit 25 is turned off. Thus, the light emitting diode 21 will not light up.

Figure 5:
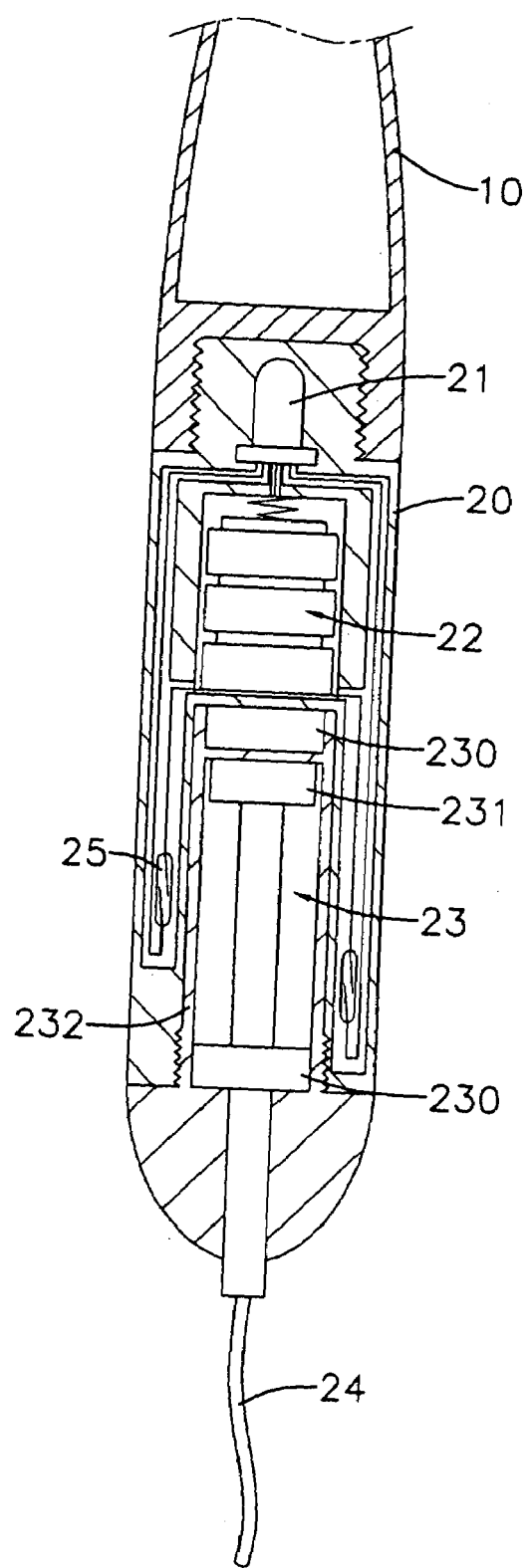
FIG. 5 is a partial cross sectional view of another embodiment of the present invention.

With reference to FIG. 5, the embodiment illustrated in this drawing is approximately like the above one, the difference is that there are two switch units 25 for controlling the emission of the light emitting diode 21 to have different colors.

Figure 6:
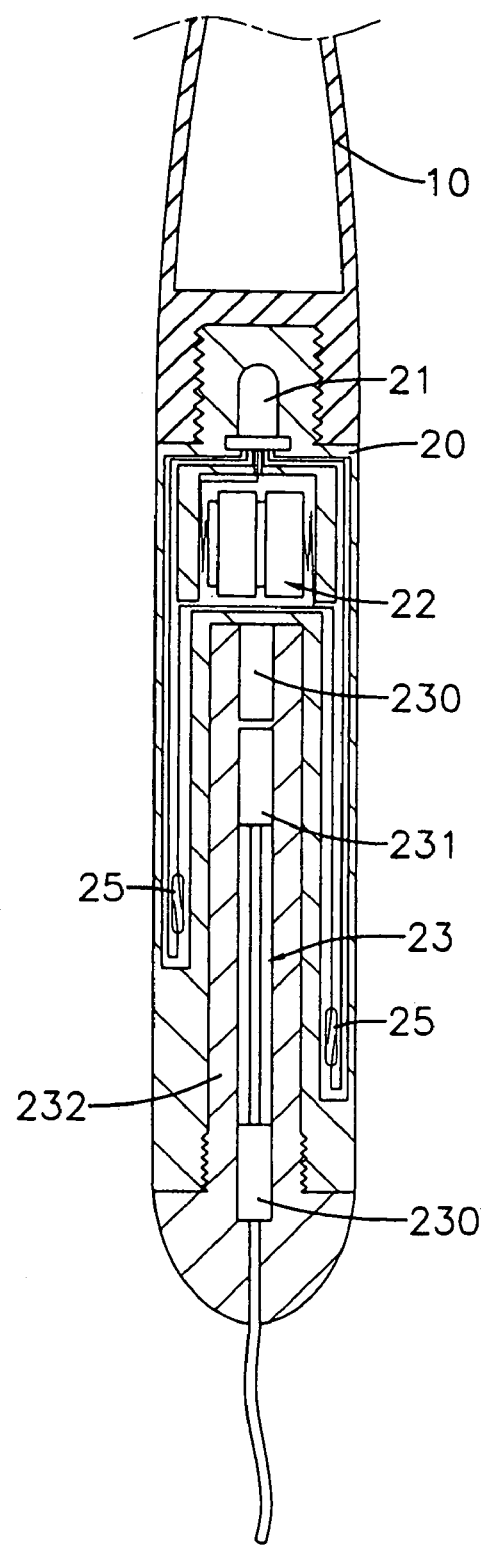
FIG. 6 is a partial cross sectional view of a further embodiment of the present invention.

With reference to FIG. 6, the battery 22 and magnetic element 23 are longitudinally installed in the magnetic switch body 20, which can also achieve the same effect as above mentioned one.

In the following, the assembly of the polarities of the movable magnetic block 231 and the retaining magnetic block 230 of the magnetic element 23 will be described herein.

Figure 7:
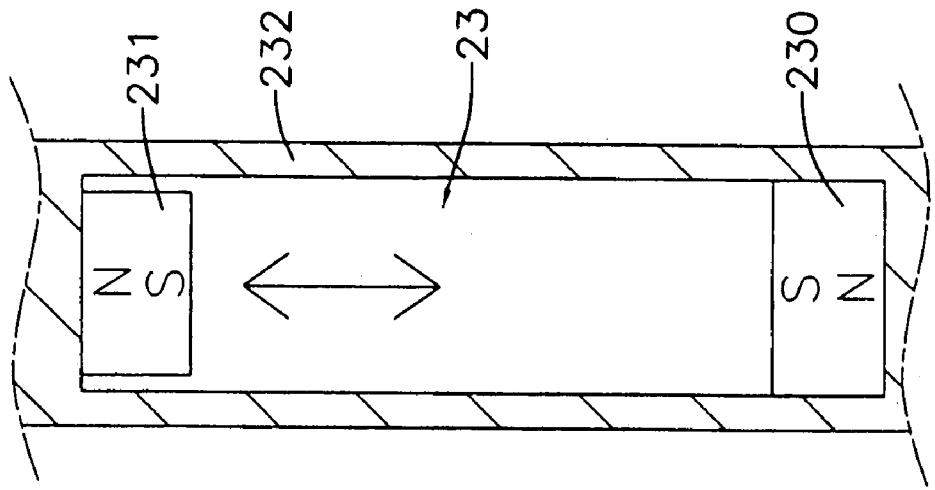
FIGS. 7 to 10 are schematic views of the arrangements of the magnetic elements of the present invention.
Figure 7:
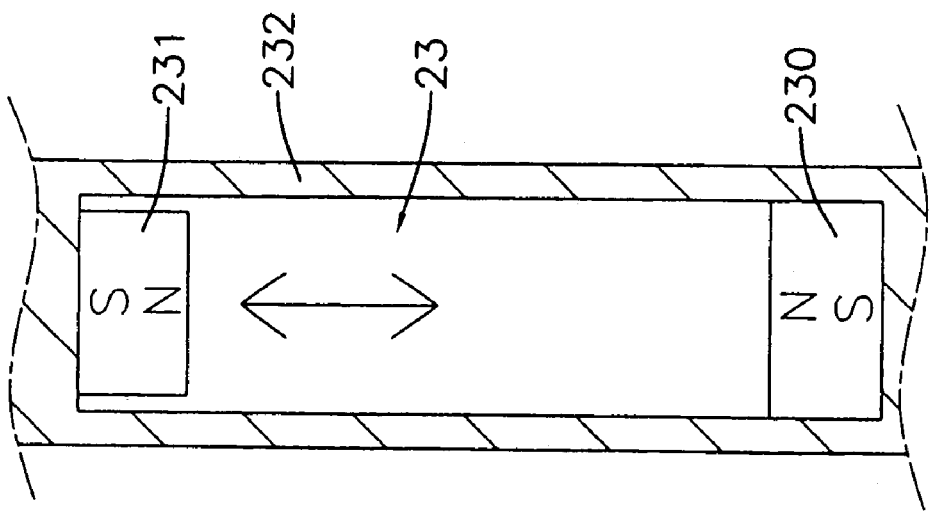

Referring to FIG. 7A, in this embodiment, the movable magnetic block 231 is placed above the retaining magnetic block 230. The N polarity of the movable magnetic block 231 faces to the N polarity of the retaining magnetic block 230. Referring to FIG. 7B, in this embodiment the S polarity of the movable magnetic block 231 faces to the S polarity of the retaining magnetic block 230.

Figure 8:
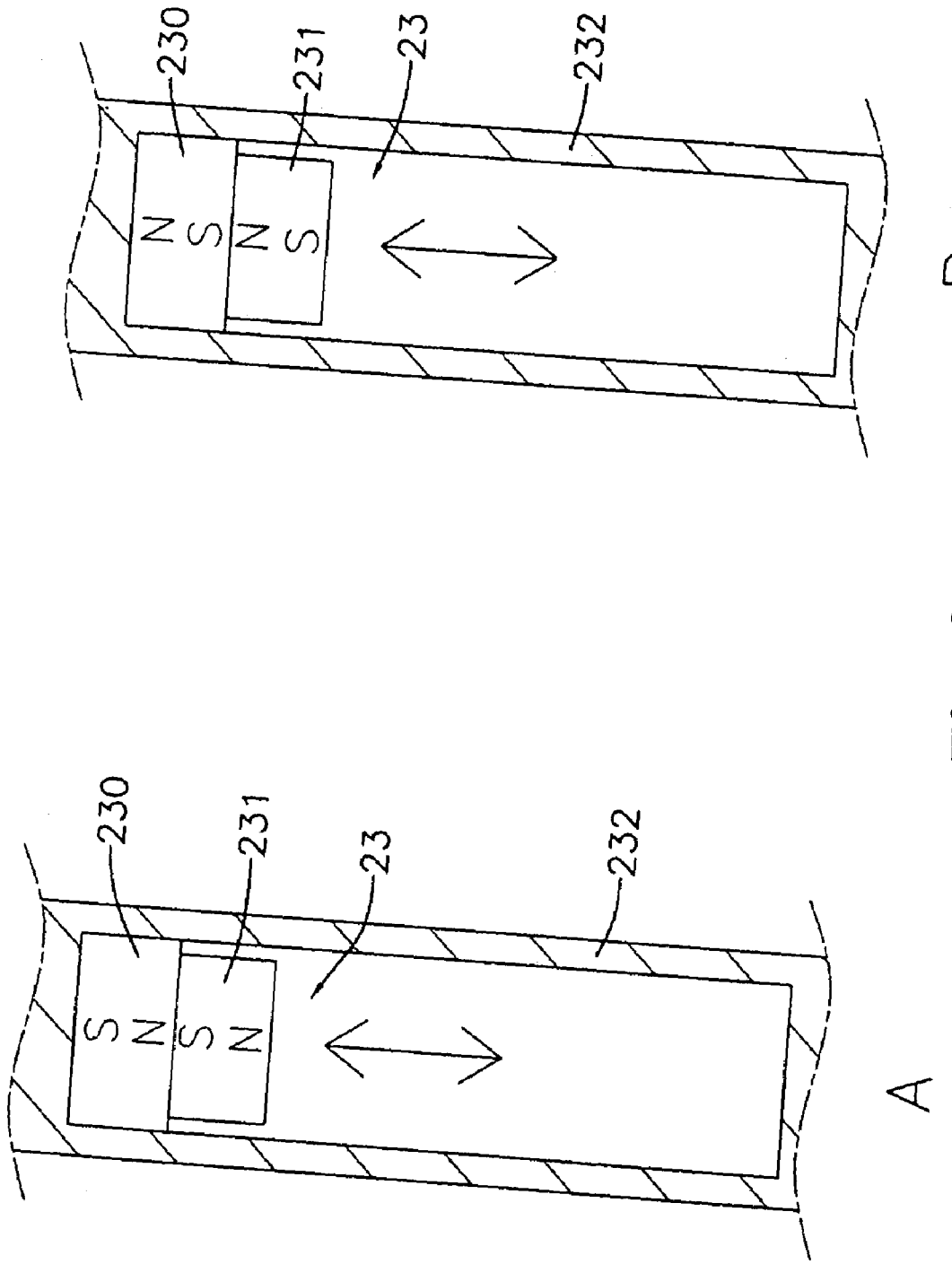

Referring to FIG. 8A, in this embodiment, the retaining magnetic block 230 is placed above the movable magnetic block 231. The N polarity of the retaining magnetic block 230 faces the S polarity of the movable magnetic block 231. Referring to FIG. 8B, the S polarity of the retaining magnetic block 230 faces the N polarity of the movable magnetic block 231.

Figure 9:
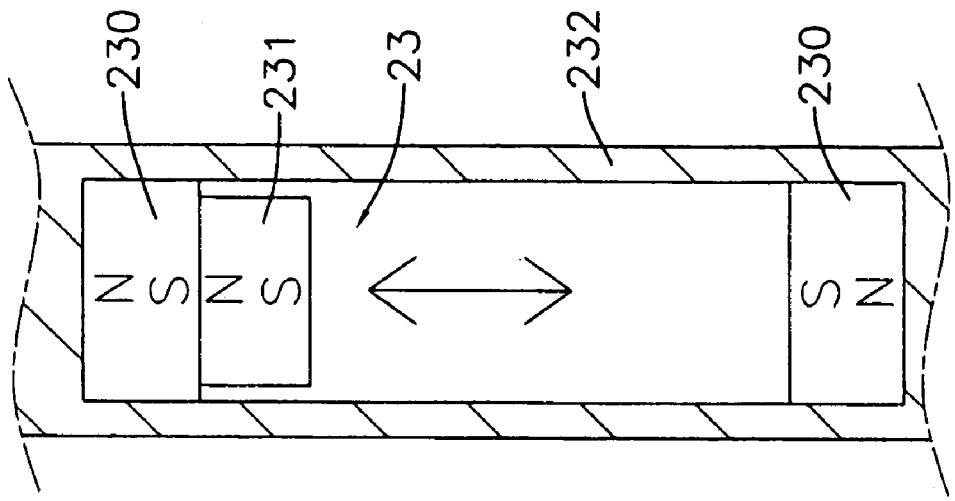
Figure 9:
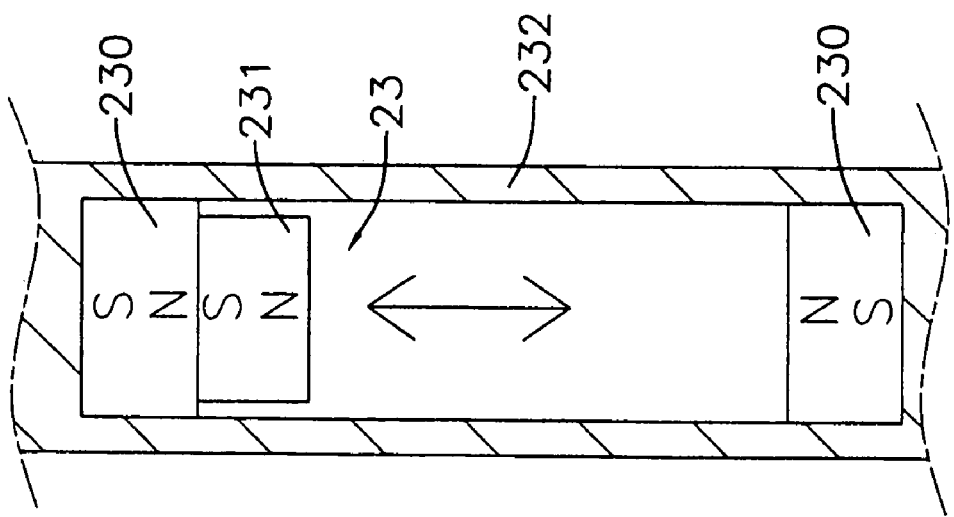

Referring to FIG. 9A, in this embodiment, the magnetic element 23 has two retaining magnetic blocks 230. The movable magnetic block 231 is installed between the two retaining magnetic blocks 230. The N polarity of the upper retaining magnetic block 230 faces the S polarity of the movable magnetic block 231 and the N polarity of the lower retaining magnetic block 230 faces the N polarity of the movable magnetic block 231. Referring to FIG. 9, in a similar structure, the S polarity of the upper retaining magnetic block 230 faces the N polarity of the movable magnetic block 231 and the S polarity of the lower retaining magnetic block 230 faces the S polarity of the movable magnetic block 231.

Figure 10:
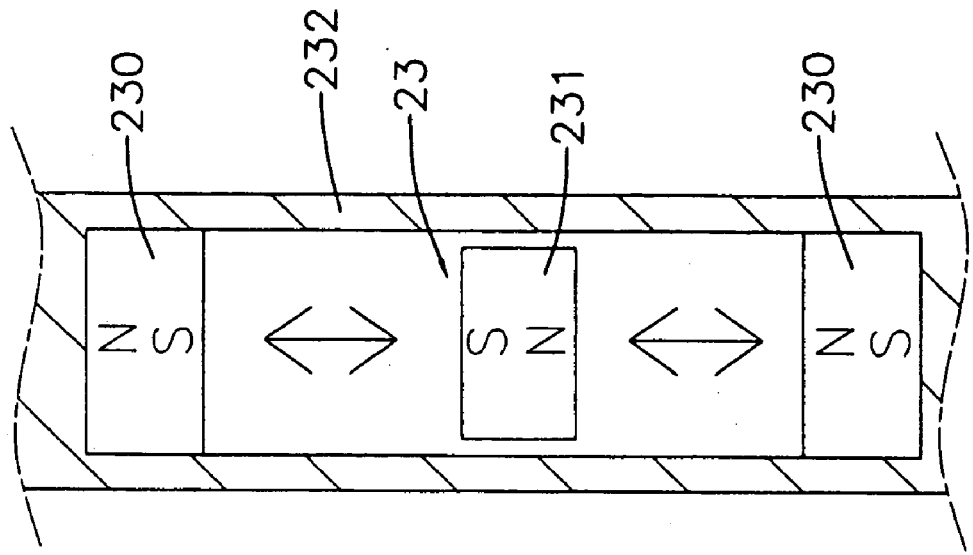
Figure 10:
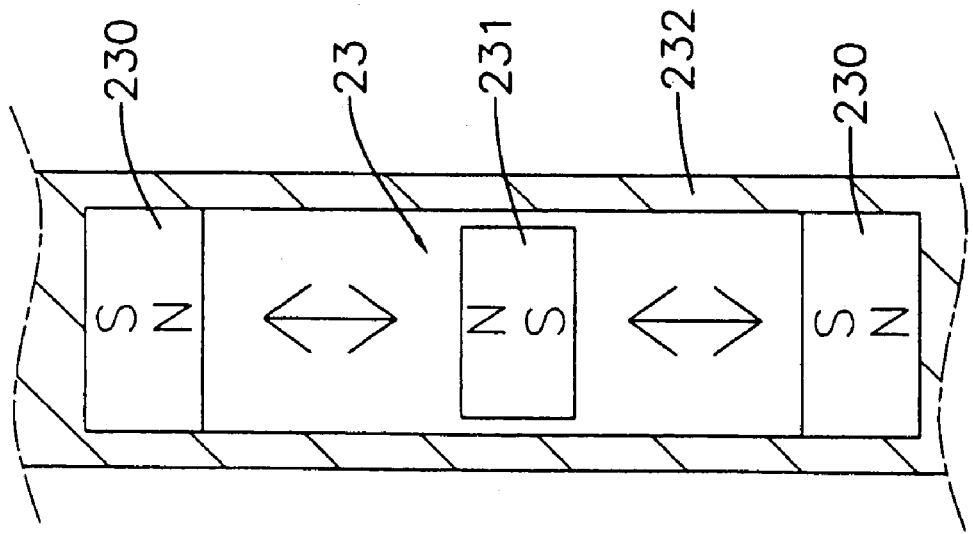

Referring to FIG. 10A, in this embodiment, there are two retaining magnetic blocks 230. The movable magnetic block 231 is placed between the two retaining magnetic blocks 230. The N polarity of the upper retaining magnetic block 230 faces the N polarity of the movable magnetic block 231 and the S polarity of the lower retaining magnetic block 230 faces the S polarity of the movable magnetic block 231. With reference to FIG. 10B, in a similar structure, the S polarity of the upper retaining magnetic block 230 faces the S polarity of the movable magnetic block 231 and the N polarity of the lower retaining magnetic block 230 faces the N polarity of the movable magnetic block 231.

Figure 11:
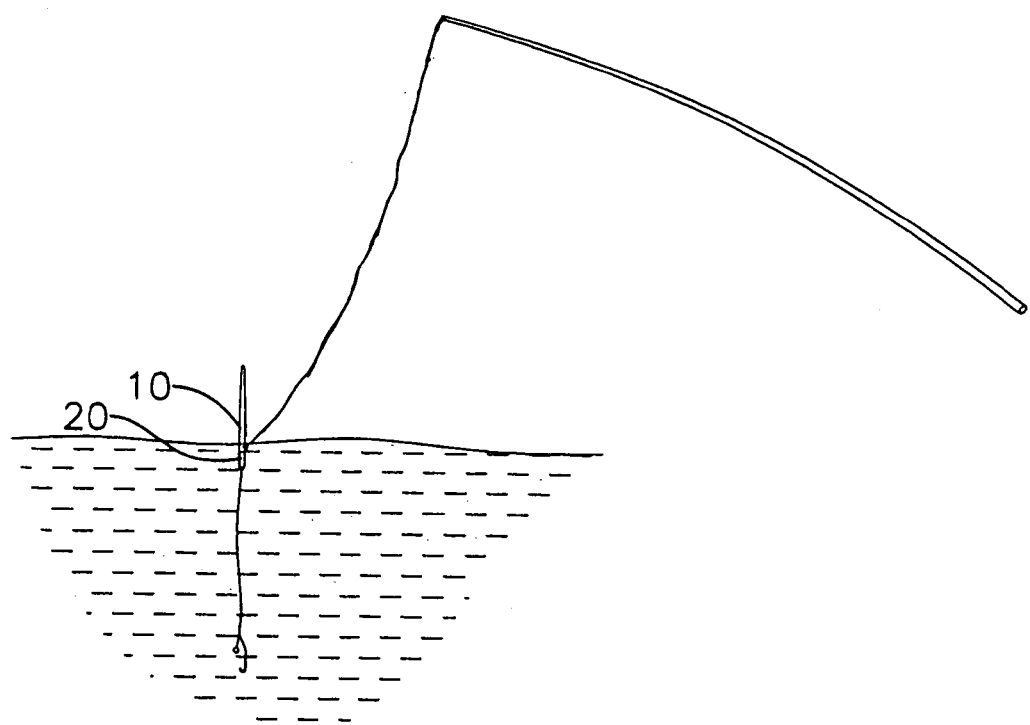
FIG. 11 is a schematic view showing the use of the present invention.
Figure 12:
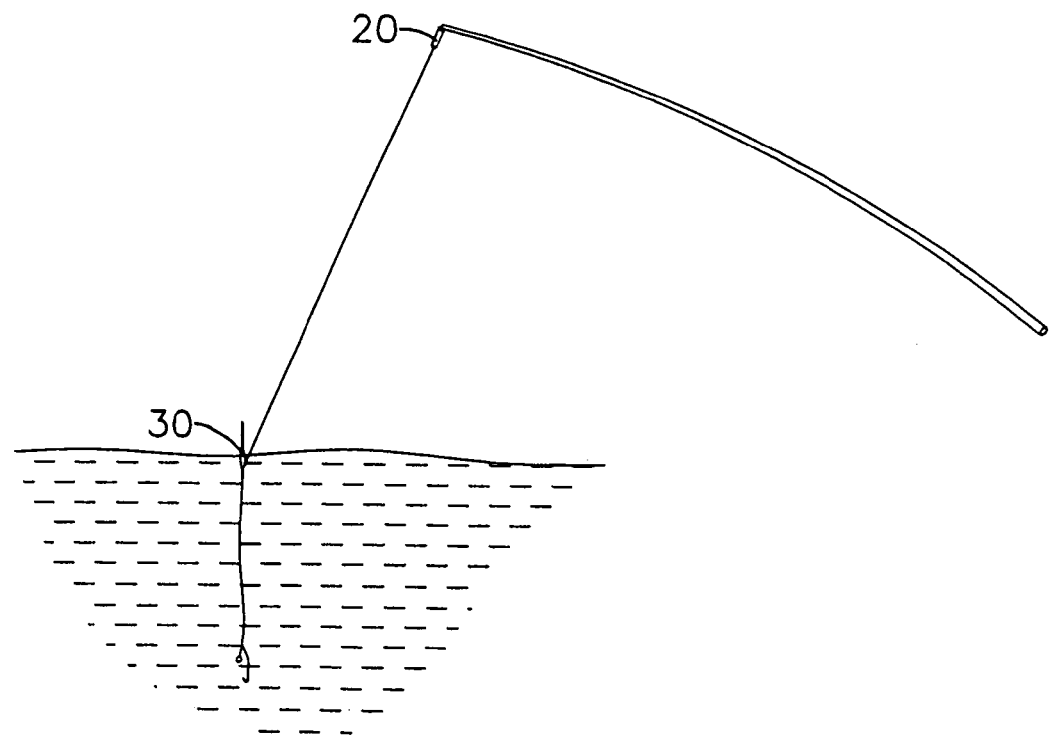
FIG. 12 is a schematic view showing another use of the present invention.

With reference to FIG. 11, it is illustrated that the buoyage 10 of the present invention can be used in a general case. With reference to FIG. 12, in the present invention, the casing 20 of the magnetic switch is connected to a fishing rod and then a general used buoyage 30 is connected to the casing 20 through a fishing wire.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A light emitting buoyage with a magnetic switch comprising:
    a buoyage;
    a magnetic switch body connected to the buoyage;
    a battery located in said magnetic switch body;
    a light emitting diode at an upper end of the magnetic switch body and the battery being at a lower end of the lighting emitting diode;
    a magnetic element at a lower end of the battery;
    a connecting wire attached to the magnetic element extending from a lower end of the magnetic element for being further connected to a fish wire; and
    a switch unit installed in the magnetic switch body at one side of the magnetic element; and the switch unit being in electrical communication to the light emitting diode and the battery;
    wherein the magnetic element has a body; the magnetic element body is installed with at least one retaining magnetic block and at least one movable magnetic block; the magnetic element body is screwed to a lower end of the magnetic switch body; and the connecting wire is connected to the movable magnetic block whereby a pull of a fish causes the connecting wire to move said movable magnetic element which actuates the switch unit to cause the light emitting diode to light.

2. The light emitting buoyage with a magnetic switch as claimed in claim 1, wherein the movable magnetic block is installed above the retaining magnetic block; and a N polarity of the retaining magnetic block faces a S polarity of the movable magnetic block.

3. The light emitting buoyage with a magnetic switch as claimed in claim 1, wherein the movable magnetic block is installed above the retaining magnetic block; and a S polarity of the retaining magnetic block faces a S polarity of the movable magnetic block.

4. The light emitting buoyage with a magnetic switch, as claimed in claim 1, wherein the retaining magnetic block is installed above the movable magnetic block and a N polarity of the retaining magnetic block faces a S polarity of the movable magnetic block.

5. The light emitting buoyage with a magnetic switch as claimed in claim 1, wherein the retaining magnetic block is installed above the movable magnetic block; and a S polarity of the retaining magnetic block faces a N polarity of the movable magnetic block.

6. The light emitting buoyage with a magnetic switch as claimed in claim 1, wherein there are two retaining magnetic blocks and one movable magnetic block; the movable magnetic block is installed between the two retaining magnetic blocks; a N polarity of the upper retaining magnetic block faces a S polarity of the movable magnetic block; and a N polarity of the lower retaining magnetic block faces a N polarity of the movable magnetic block.

7. The light emitting buoyage with a magnetic switch as claimed in claim 1, wherein there are two retaining magnetic blocks and one movable magnetic block; the movable magnetic block is installed between the two retaining magnetic blocks; a S polarity of the upper retaining magnetic block faces a N polarity of the movable magnetic block; and a S polarity of the lower retaining magnetic block faces a S polarity of the movable magnetic block.

8. The light emitting buoyage with a magnetic switch as claimed in claim 1, wherein there are two retaining magnetic blocks and one movable magnetic block; the movable magnetic block is installed between the two retaining magnetic blocks; a N polarity of the upper retaining magnetic block faces a N polarity of the movable magnetic block; and a S polarity of the lower retaining magnetic block faces a S polarity of the movable magnetic block.

9. The light emitting buoyage with a magnetic switch as claimed in claim 1, wherein there are two retaining magnetic blocks and one movable magnetic block; the movable magnetic block is installed between the two retaining magnetic blocks; a S polarity of the upper retaining magnetic block faces a S polarity of the movable magnetic block; and a N polarity of the lower retaining magnetic block faces a N polarity of the movable magnetic block.

10. A light emitting buoyage with a magnetic switch comprising:

a buoyage;

a magnetic switch body connected to the buoyage;

a battery located in said magnetic switch body;

a light emitting diode at an upper end of the magnetic switch body and the battery being at a lower end of the light emitting diode;

a magnetic element at a lower end of the battery;

a connecting wire of the magnetic switch body extending from a lower end of the magnetic element for being further connected to a fish wire; and a switch unit installed in the magnetic switch body at one side of the magnetic element; and the switch unit being electrical communication to the light emitting diode and the battery;

wherein the battery and the magnetic element are transversally installed in the magnetic switch body;

wherein the magnetic element has a body; the magnetic element body is installed with at least one retaining magnetic block and at least one movable magnetic block; the magnetic element body is screwed to a lower end of the magnetic switch body; and the connecting wire is connected to the movable magnetic block whereby a pull of a fish causes the connecting wire to move said movable magnetic element which actuates the switch unit to cause the light emitting diode to light.

11. A light emitting buoyage with a magnetic switch comprising:

a buoyage;

a magnetic switch body connected to the buoyage;

a battery located in said magnetic switch body;

a light emitting diode located at an upper end of the magnetic switch body and the battery being at a lower end of the light emitting diode;

a magnetic element at a lower end of the battery;

a connecting wire of the magnetic switch body extending from a lower end of the magnetic element for being further connected to a fish wire; and a switch unit installed in the magnetic switch body at one side of the magnetic element; and the switch unit being conductive to the light emitting diode and the battery; the switch unit being electrically connected to the light emitting diode and the battery;

wherein the battery and the magnetic element are longitudinally installed in the magnetic switch body;

wherein the magnetic element has a body; the magnetic element body is installed with at least one retaining magnetic block and at least one movable magnetic block; the magnetic element body is screwed to a lower end of the magnetic switch body; and the connecting wire is connected to the movable magnetic block whereby a fish pulling on said connecting wire moves the movable magnetic element which in turn causes the switch unit to actuate to cause the light emitting diode to light.

* * * * *